United States Patent
Huang et al.

(10) Patent No.: US 9,515,484 B2
(45) Date of Patent: Dec. 6, 2016

(54) SYSTEM AND METHOD FOR REDUCING REACTIVE CURRENT ON A COMMON DC BUS WITH MULTIPLE INVERTERS

(71) Applicant: Rockwell Automation Technologies, Inc., Mayfield Heights, OH (US)

(72) Inventors: Rongjun Huang, Saint Louis, MO (US); Craig Winterhalter, Cedarburg, WI (US); Mark Gries, Milwaukee, WI (US); Ye Li, Madison, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 586 days.

(21) Appl. No.: 13/910,656

(22) Filed: Jun. 5, 2013

(65) Prior Publication Data

US 2014/0361613 A1    Dec. 11, 2014

(51) Int. Cl.
*H02J 1/08* (2006.01)
*H02J 1/06* (2006.01)
(Continued)

(52) U.S. Cl.
CPC ............... *H02J 1/06* (2013.01); *H02M 1/14* (2013.01); *H02M 7/493* (2013.01); *H02M 2001/008* (2013.01); *Y10T 307/258* (2015.04)

(58) Field of Classification Search
CPC ............ H02J 1/06; H02M 7/493; H02M 1/14; H02M 2001/008; Y10T 307/258
(Continued)

(56) References Cited

U.S. PATENT DOCUMENTS

| 4,628,460 A | * | 12/1986 | Frederich ............ H02M 1/0845 318/257 |
| 5,408,404 A | | 4/1995 | Mitchell |

(Continued)

FOREIGN PATENT DOCUMENTS

| EP | 1186464 A2 | 3/2002 |
| EP | 2562903 A2 | 2/2013 |

OTHER PUBLICATIONS

Pekik Argo Dahono, Yukihiko Sato and Teruo Kataoka; Analysis and Minimization of Ripple Components of Input Current and Voltage of PWM Inverters; IEEE Transactions on Industry Applications, vol. 32, No. 4 Jul./Aug. 1995 (6 pages).

(Continued)

*Primary Examiner* — Jared Fureman
*Assistant Examiner* — Alfonso Perez Borroto
(74) *Attorney, Agent, or Firm* — Boyle Fredrickson, S.C.

(57) ABSTRACT

A system configured to reduce the amplitude of reactive current present on a DC bus shared by multiple inverters is disclosed. The start of the switching period for the modulation routines of each inverter is synchronized, and a carrier phase angle is determined for a carrier signal within each of the inverters. The modulation routine of each inverter generates a reactive current on the shared DC bus. By controlling the carrier phase angle for each inverter, the reactive current of a first inverter may be generated at a phase angle that is offset from the phase angle of the reactive current generated by a second inverter. As a result, the reactive current from the first inverter cancels at least a portion of the reactive current from the second inverter, reducing the total reactive current present on the DC bus.

20 Claims, 11 Drawing Sheets

(51) Int. Cl.
*H02M 1/14* (2006.01)
*H02M 7/493* (2007.01)
*H02M 1/00* (2006.01)

(58) Field of Classification Search
USPC .................................................... 307/12, 38
See application file for complete search history.

(56) References Cited

U.S. PATENT DOCUMENTS

| | | | |
|---|---|---|---|
| 6,864,646 | B2 | 3/2005 | Rahman et al. |
| 6,897,698 | B1 | 5/2005 | Gheorghiu et al. |
| 7,151,394 | B2 | 12/2006 | Gheorghiu et al. |
| 7,199,622 | B2 | 4/2007 | Chang et al. |
| 7,295,448 | B2 | 11/2007 | Zhu |
| 7,425,806 | B2 | 9/2008 | Schnetzka et al. |
| 2004/0174018 | A1* | 9/2004 | Itoh ........... B60W 10/26 290/40 C |
| 2005/0225270 | A1 | 10/2005 | Schnetzka et al. |
| 2006/0110140 | A1* | 5/2006 | Harada ........... H02P 6/06 388/804 |
| 2009/0167220 | A1* | 7/2009 | Kanamori ........ H02P 6/20 318/400.11 |
| 2009/0167376 | A1* | 7/2009 | Pellen ............. H02P 5/74 327/142 |
| 2012/0153882 | A1* | 6/2012 | Hong ............. H02P 27/08 318/400.26 |

OTHER PUBLICATIONS

J.W. Kolar and S.D. Round; Analytical calculation of the RMS current stress on the DC-link capacitor of voltage-PWM converter systems; IEE Proc.-Electr. Power Appl, vol. 153, No. 4, Jul. 2006 (9 pages).

D.G. Holmes; A General Analytical Method for Determining the Theoretical Harmonic Components of Carrier Based PWM Strategies, 1998 IEEE (8 pages).

J.F. Moynihan, M.G. Egan and J.M.D. Murphy; Theoretical spectra of space-vector-modulated waveforms; IEE Proc.-Electr. Power Appl., vol. 145, No. 1, Jan. 1998 (8 pages).

Michael Bierhoff and Friedrich W. Fuchs; DC Link Harmonics of Three Phase Voltage Source Converters Influenced by the Pulse Width Modulation Strategy—an Analysis; IEEE Trans. on Industrial Elect. vol. 55 No. 5, May 2008 (6 pages).

Brendan Peter McGrath and Donald Grahame Holmes; A General Analytical Method for Calculatinginverter DC-Link Current Harmonics; IEEE Transactions on Industry Applications, vol. 45, No. 5, Sep./Oct. 2009 (9 pages).

Ffrançois Costa, Christian Vollaire, and Régis Meuret; Modeling of Conducted Common Mode Perturbations in Variable-Speed Drive Systems; © 2005 IEEE (10 pages).

Asiminoaei; Parallel Interleaved Inveqers for Reactive Power and Harmonic Compensation; Power Electronics Specialists Conference, Jun. 2006 (7 pages).

Extended European Search Report dated Jun. 16, 2015; Application No. 14171100.2—(8) pages.

* cited by examiner

SYSTEM AND METHOD FOR REDUCING REACTIVE CURRENT ON A COMMON DC BUS WITH MULTIPLE INVERTERS

BACKGROUND OF THE INVENTION

The subject matter disclosed herein relates generally to a system having a direct current (DC) bus which is shared by multiple inverters and, more specifically, to a system for reducing the amplitude of reactive current present on the DC bus as a result of the multiple inverters.

As is known to those skilled in the art, a motor drive receives an input voltage and converts the input voltage to a suitable output voltage for controlling operation of a motor. In an Alternating Current (AC) motor drive, a three phase AC voltage is typically available at, for example, 230 V or 460 V as the input voltage. The motor drive includes a converter section that rectifies the AC input voltage into a Direct Current (DC) voltage. The DC voltage is present across a first rail and a second rail of a DC bus in the motor drive. An inverter section includes switches, such as transistors, thyristors, or silicon-controlled rectifiers to convert the DC voltage on the DC bus into an AC voltage output at the desired magnitude and frequency to control operation of the motor. It is also known that the converter, DC bus, and inverter sections may be enclosed in a single housing as a centralized motor drive configured to be mounted in a control cabinet. Alternately, a portion of the motor drive, such as the inverter section, may be included in a separate housing or integrated into the motor housing and located by the motor to be controlled. The converter section may be included a housing configured to be mounted in the control cabinet. A DC link including a DC bus cable, as well as, inductive or capacitive elements connects the converter section to one or more distributed inverter sections.

The motor drive often utilizes a pulse-width modulation (PWM) routine to control the switches in the inverter section. The switches alternately connect and disconnect either the first or second rail of the DC bus to the AC output. The resulting output is, therefore, either zero volts or fully on at the voltage level present on the DC bus. In order to vary the magnitude of the output voltage, the PWM routine repeatedly executes at a predetermined interval, sometimes referred to as a carrier period, where the inverse of the carrier period is the carrier frequency. The PWM routine receives a reference signal corresponding to the desired output voltage magnitude and controls the switches such that the DC bus is connected to the output for a portion of the carrier period. Thus, during each carrier period, the output is on for a percentage of the carrier period and off for the remaining percentage of the carrier period and an average voltage magnitude for each carrier period results. By varying the percentage of the carrier period that each switch is on or off, the average voltage magnitude varies such that it corresponds to the reference signal input to the PWM routine. If the fundamental frequency of the desired AC voltage is much less than the carrier frequency, the resulting output voltage waveform approximates the desired AC voltage.

However, the high frequency switching generates undesirable reactive currents at the carrier frequency and harmonics, or multiples, thereof, which may be present, for example, on the DC bus. The reactive current present on the DC bus is of particular concern in a distributed motor drive. The inverter sections may be a significant distance from the converter section, and the DC bus cable and other reactive DC link components such as inductors and capacitors present a significant impedance to the high frequency reactive currents. The reactive currents are dissipated, at least in part, as power losses in the DC link components as a result of these impedances. In addition, if multiple inverter sections are connected to a single converter, each generates reactive currents which are transferred to the DC bus, increasing the potential maximum amplitude of the reactive currents.

Historically, it has been known to increase the size of the DC link components for the DC bus between the converter section and the inverter sections to accommodate the increased current. However, in some applications the inverter sections are mounted on the machines that they control and distributed about a controlled machine or process. Thus, tens or hundreds of feet of cabling may be required to connect each inverter section to the converter section. An increase in the wire gauge or other DC link components results in a significant increase in cost and potentially undesirable weight to the controlled system.

Thus, it would be desirable to control the switching of each inverter on a shared DC bus to reduce the overall reactive current present on the DC bus.

BRIEF DESCRIPTION OF THE INVENTION

The subject matter disclosed herein describes a system configured to reduce the amplitude of reactive current present on a DC bus shared by multiple inverters. The system may include one processor configured to control multiple inverters or multiple processors each configured to control a respective inverter. A synchronizing signal is generated by one of the processors to coordinate the start of each switching period for the modulation routines of each inverter. A carrier phase angle is determined for each of the inverters which defines the point within a carrier signal used by the modulation routine of each inverter that corresponds to the start of the switching period. The modulation routine of each inverter generates a reactive current, one component of which is known as a ripple current, on the shared DC bus. By controlling the carrier phase angle for each inverter, the reactive current of a first inverter may be generated at a phase angle that is offset from the phase angle of the reactive current generated by a second inverter. As a result, the reactive current from the first inverter cancels at least a portion of the reactive current from the second inverter, reducing the total reactive current present on the DC bus.

According to one embodiment of the invention, a system for reducing a reactive current present on a DC bus is disclosed. The DC bus has a first voltage rail and a second voltage rail and is configured to have a DC voltage potential present between the first voltage rail and the second voltage rail. The system includes a plurality of inverters, and each inverter includes an input configured to connect to the first and second voltage rails of the DC bus, an output configured to connect to an alternating current (AC) load, and a plurality of switching devices. Each switching device is controlled by a switching signal to alternately connect and disconnect the input to the output.

A modulation module is configured to execute at a periodic interval. During each periodic interval the modulation module determines each of the switching signals as a function of a carrier signal that repeats within the periodic interval and at least one voltage reference signal. Each carrier signal is defined at least in part by a carrier phase angle, and each voltage reference signal corresponds to a desired output voltage for each phase of the AC load. A synchronizing signal is in communication with each of the modulation modules and is used by each modulation module to start its corresponding periodic interval at substantially the same time.

A controller generates the carrier phase angle for each inverter. The carrier phase angle for each inverter is determined such that a first reactive current generated by the plurality of switching devices which alternately connect and disconnect the input to the output in a first inverter is at least partially cancelled by a second reactive current generated by the plurality of switching devices which alternately connect and disconnect the input to the output in a second inverter.

According to another embodiment of the invention, an inverter for connection to a common DC bus is disclosed. The common DC bus has a first voltage rail, a second voltage rail, a DC voltage potential present between the first voltage rail and the second voltage rail, and at least one additional inverter connected to the common DC bus. The inverter includes a first input configured to receive a synchronizing signal, a second input configured to receive an indication of the number of additional inverters connected to the common DC bus, a DC bus input configured to connect to the first and second voltage rails of the common DC bus, an output configured to connect to an AC load, a memory device configured to store an identifier corresponding to each inverter, a controller configured to generate a carrier phase angle, and a plurality of switching devices controlled by a switching signal to alternately connect and disconnect the DC bus input to the output. The carrier phase angle is determined as a function of the number of additional inverters connected to the common DC bus and of the identifier.

A modulation module is configured to execute at a periodic interval. A start time of each periodic interval is defined, at least in part, by the synchronizing signal, and during each periodic interval, the modulation module determines each of the switching signals as a function of a carrier signal that repeats within the periodic interval and at least one voltage reference signal. Each carrier signal is defined at least in part by the carrier phase angle and corresponds to a desired output voltage for each phase of the AC load.

According to yet another embodiment of the invention, a method of controlling a plurality of inverters, where each inverter converts a DC voltage from a shared DC bus to an AC voltage, is disclosed. According to the method, a synchronizing signal is generated with a controller, and the synchronizing signal defines a start of a periodic interval for a modulation routine for each of the inverters. A carrier phase angle is determined for each of the inverters with the controller such that a first reactive current generated by a first inverter is at least partially cancelled by a second reactive current generated by a second inverter. A carrier signal is generated for the modulation routine for each of the inverters with the controller as a function of the carrier phase angle. The modulation module is executing for each inverter to determine a plurality of switching signals as a function of the carrier signal and of at least one voltage reference signal. Each voltage reference signal corresponds to a desired output voltage for each phase of the AC voltage and each switching signal controls a switching device to alternately connect and disconnect the DC bus to an output of the inverter.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which.

Figure 1:
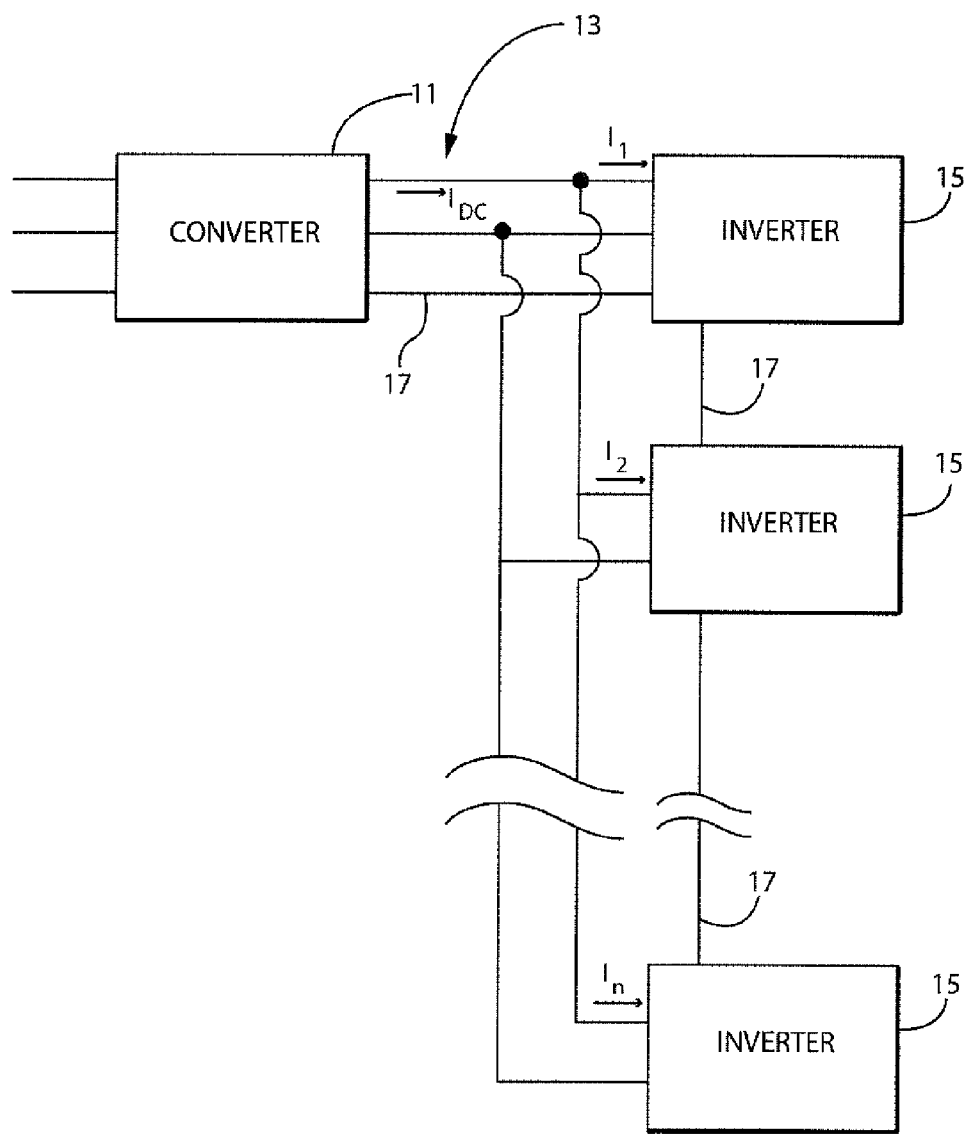
FIG. 1 is a block diagram representation of an exemplary system incorporating one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION OF THE PREFERRED EMBODIMENTS

Turning initially to FIG. 1, a block diagram representation of a system including multiple inverters 15 connected to a single DC bus 13 is illustrated. According to the illustrated embodiment, a converter 11 receives power in a first form and provides it to the DC bus 13. The input may be a DC voltage or an AC voltage, where the AC voltage is either single phase or multi-phase. The converter 11 is configured to supply a regulated DC voltage on the DC bus 13. The system includes at least a first inverter 15 and a second inverter 15, but may include any number of additional inverters 15. Each inverter 15 converts the DC voltage present on the DC bus 13 to an AC voltage for use by an electrical load. Communication media 17 extends between the converter 11 and each inverter 15. The communication media 17 may be a single electrical conductor, multiple electrical conductors, a network cable configured to transmit data packets, or any other suitable communication media 17 configured to transmit data between the devices according to application requirements. Optionally, the communication media 17 may extend only between the inverters 15.

Figure 2:
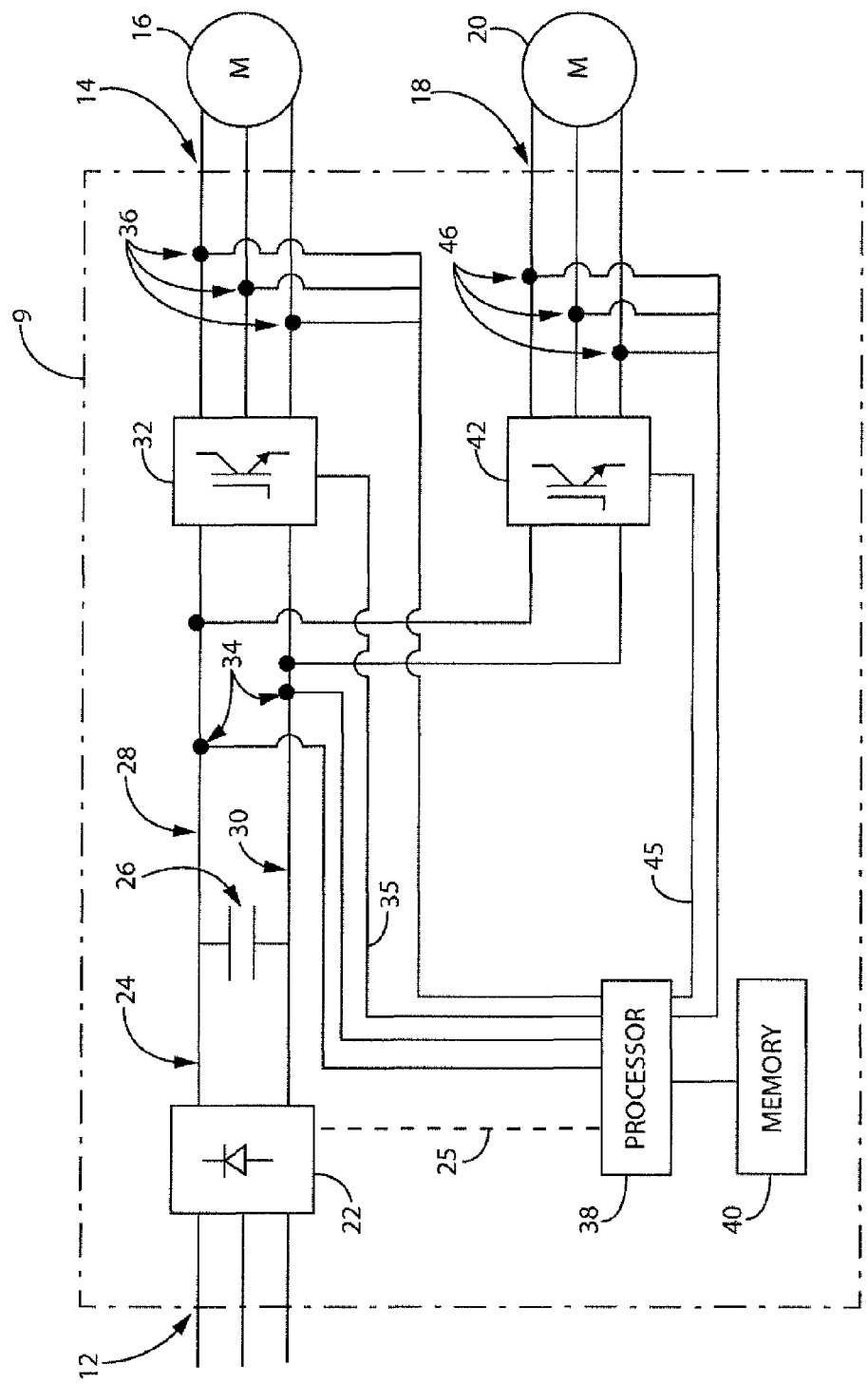
FIG. 2 is a schematic representation of a multi-axis motor drive incorporating one embodiment of the present invention.

Turning next to FIG. 2, one embodiment of the present invention includes a motor drive 9 connected to a three phase AC input voltage 12. The motor drive 9 is configured with multiple inverter sections 32 and 42 to provide multiple outputs 14 and 18, respectively. The motor drive 9 generates a first output 14, illustrated as a three phase AC output voltage, to control a first motor 16, and a second output 18, also illustrated as a three phase AC output voltage, to control a second motor 20. It is contemplated that the output voltage, 14 or 18, could be a single phase AC output voltage, a multi-phase AC output voltage, or a DC voltage, as required by the motor connected to the drive without deviating from the scope of the invention.

The AC input voltage 12 is converted to a DC voltage present on the DC bus 24 by a converter section 22. The DC voltage potential is present between a first rail 28 and a second rail 30 of the DC bus 24. A DC bus capacitor 26 is connected between the first and second rails, 28 and 30, to reduce the magnitude of the reactive voltage resulting from converting the AC voltage to a DC voltage. It is understood that the DC bus capacitor 26 may be a single capacitor or multiple capacitors connected in parallel, in series, or a combination thereof. The magnitude of the voltage potential between the first and second rails, 28 and 30, is generally about equal to or greater than the magnitude of the peak of the AC input voltage. It is further contemplated that the DC bus may include more than two rails including, but not limited to multiple positive rails, multiple negative rails, a neutral rail, or combinations thereof as would be present, for example, in a multi-level converter.

Figure 4:
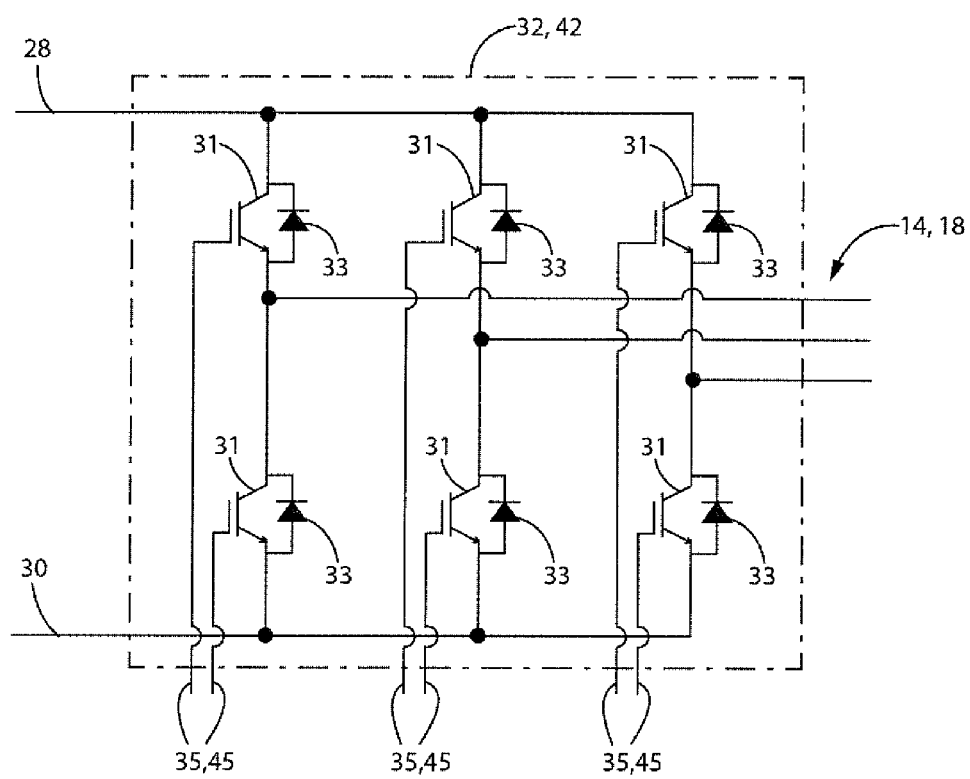
FIG. 4 is a schematic representation of an inverter section from one of the inverters of FIG. 3.

A single converter section 22 is provided between the input voltage 12 and the DC bus 24 while two inverter sections 32 and 42 are provided between the common DC bus 24 and their respective output 14 and 18. It is contemplated that other numbers of inverter sections could be included without deviating from the scope of the invention. The converter section 22 may be either passive or active, where a passive rectifier utilizes electronic devices such as diodes, which require no control signals, to convert the AC voltage to a DC voltage and an active converter utilizes, for example, transistors, which receive switching signals 25 to turn on and off, to convert the input voltage 12 to the desired DC voltage. Referring also to FIG. 4, each inverter section 32, 42 includes multiple switches 31 which selectively connect one phase of each output 14, 18 to either the first rail 28 or the second rail 30. Each switch 31 may be a transistor and further include a diode 33 connected in parallel to the transistor. Each switch 31 receives a switching signal 35, 45 to enable or disable conduction through the transistor to selectively connect each phase of the output 14, 18 to the first rail 28 or the second rail 30 of the DC bus 24.

The processor 38 executes a program stored on a memory device 40, where the program includes a series of instructions executable on the processor 38 to control operation of the motor drive 9. Each program receives a reference signal identifying desired operation of the motor 16 connected to the motor drive 9. The processor 38 also receives feedback signals from voltage and/or current sensors positioned within the motor drive 9. Sensors 34 may be provided to measure the voltage and/or current on the DC bus 24, and additional sensors 36, 46 may be provided to measure voltage and/or current on one, two, or all three phases of the outputs, 14 or 18. The program executes a control routine responsive to the reference signal and to the feedback signals and generates a desired voltage reference signal 102, 112, see also FIGS. 7-10. The processor 38 also executes a modulation routine, such as pulse width modulation (PWM), to generate switching signals, 35 or 45, to control the switches 31 of each inverter section 32 or 42 responsive to the desired voltage reference signal 102, 112.

Figure 3:
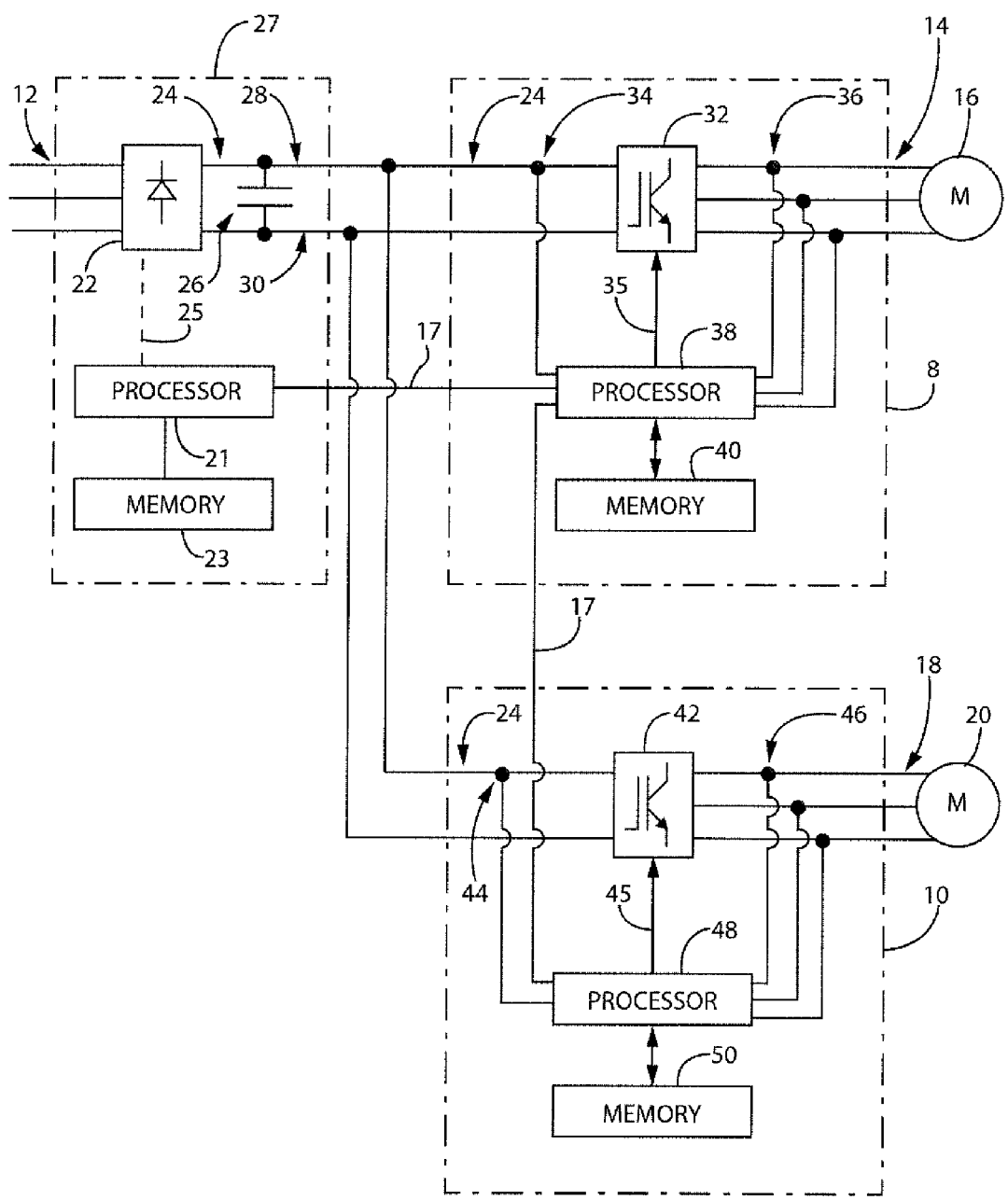
FIG. 3 is a schematic representation of a distributed motor drive system incorporating one embodiment of the present invention.

Turning next to FIG. 3, another embodiment of the present invention includes a converter 27, connected to the three phase AC input voltage 12. A DC bus 24 distributes the DC voltage from the converter 27 to a first remote device 8 and a second remote device 10. The first and second remote devices, 8 and 10, may be, for example, distributed motor drives. The first remote device 8 generates a first output 14, illustrated as a three phase AC output voltage, to control a first motor 16, and the second remote device 10 generates a second output 18, also illustrated as a three phase AC output voltage, to control a second motor 20. It is contemplated that still other embodiments of the invention may include various configurations of converters, inverters, and/or multiple axis motor drives connected to a common DC bus without deviating from the scope of the invention. It is further contemplated that the output voltage, 14 or 18, for the first or second remote device, 8 or 10 respectively, could be a single phase AC output voltage, a multi-phase AC output voltage, or a DC voltage, as required by the motor connected to the drive without deviating from the scope of the invention.

A converter section 22 converts the AC input voltage 12 to a DC voltage potential present on the DC bus 24. The converter section 22 may be either passive or active, where a passive converter utilizes electronic devices such as diodes, which require no control signals, to convert the AC voltage to a DC voltage and an active converter utilizes, for example, transistors, which receive switching signals 25 to turn on and off, to convert the AC voltage to a DC voltage. The DC voltage potential is present between a first rail 28 and a second rail 30 of the DC bus 24. A DC bus capacitor 26 is connected between the first and second rails, 28 and 30, to reduce the magnitude of the reactive voltage resulting from converting the AC voltage to a DC voltage. It is understood that the DC bus capacitor 26 may be a single capacitor or multiple capacitors connected in parallel, in series, or a combination thereof. The converter section 22 includes a processor 21 configured to execute a program stored on a memory device 23. If the converter section 22 is active, the processor may be configured to generate the switching signals 25. The processor may also be configured to generate a synchronizing signal to be output to each of the remote devices via, for example, the communication media 17.

Each of the remote devices 8, 10 includes a DC bus 24 electrically connected to the DC bus 24 of the converter 27. Referring also to FIG. 4, each inverter section 32, 42 includes multiple switches 31 which selectively connect one of the output phases 14 to either the first rail 28 or the second rail 30. Each switch 31 may be a transistor and further include a diode 33 connected in parallel to the transistor. Each switch 31 receives a switching signal 35, 45 to enable or disable conduction through the transistor to selectively connect each phase of the output 14, 18 to the first rail 28 or the second rail 30 of the DC bus 24. Each remote device 8, 10 also includes a processor 38, 48 configured to execute a program stored on a memory device 40, 50. The program includes a series of instructions executable on the processor 38, 48 to control operation of the remote device 8, 10. Each program receives a reference signal identifying desired operation of the motor 16, 20 connected to the remote device 8, 10. The reference signal may be, for example, a desired speed or torque and may be transmitted via communication media 17 from the converter 27 or from another controller. Each processor 38, 48 also receives feedback signals from voltage and/or current sensors. Sensors 34, 44 may be provided to measure the voltage and/or current on the DC bus 24, and additional sensors 36, 46 may be provided to measure voltage and/or current on one, two, or all three phases of the outputs 14, 18. The program executes a control routine responsive to the reference signal and to the feedback signals and generates a desired voltage reference signal 102, 112, see also FIGS. 7-10. The processor 38, 48 also executes a modulation routine, such as pulse width modulation (PWM), to generate the switching signals 35, 45 to control the switches of each inverter section 32, 42 responsive to the desired voltage reference signal 102, 112.

In operation, a controller executes to coordinate the modulation routines of each inverter section 32, 42 to reduce the magnitude of reactive current present on the DC bus 24. According to one embodiment of the invention, as illustrated in FIG. 2, a single processor 38 may be used. The processor 38 may be configured to execute the modulation routines and generate switching signals 35, 45 to each inverter section 32, 42 or optionally, dedicated hardware, such as an FPGA, ASIC, or motor controller may be configured to execute each modulation routine and the processor 38 may be configured to coordinate operation of the modulation routines. According to another embodiment of the invention, as illustrated in FIG. 2, the converter 27 and each remote device 8, 10 may each include a processor 21, 38, and 48 respectively. One of the processors 21, 38, and 48 may be configured to coordinate operation of each of the other processors 21, 38, and 48 or, optionally, still another control device may coordinate operation of each of the processors 21, 38, and 48. There are, therefore, various configurations and arrangements of controllers. The present invention will be discussed with respect to FIG. 3; however, the illustrated embodiment is not meant to be limiting.

One of the processors in the system is configured to be a master processor. For illustration, the processor 21 in the converter 27 will be designated as the master processor. Optionally, one of the processors 38, 48 in the remote devices may be designated as the master processor. The master processor 21 generates a synchronizing signal, which is transmitted to each of the remote devices 8, 10. The synchronizing signal is used by each of the remote devices 8, 10 to coordinate their respective modulation routines. The synchronizing signal may be any suitable signal, such as a single pulse or a counter preset value. The synchronizing signal may be sent initially upon power up, at the start of operation of a remote device 8, 10, at a periodic interval or any combination thereof.

Figure 5:
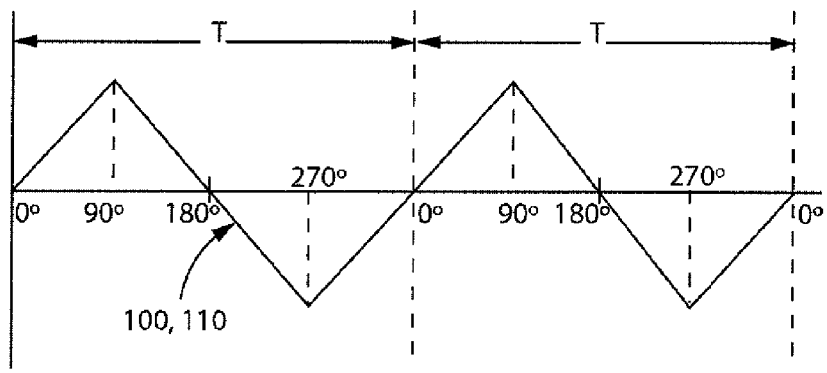
FIG. 5 is a graphical representation of a pair of carrier signals aligned with each other according to one embodiment of the invention.

Referring also to FIG. 5, modulation routines repeatedly execute at a predefined interval known as a switching period, T, which is the inverse of the switching frequency. Each remote device 8, 10 uses the synchronizing signal to coordinate the start of the switching period T, of its respective modulation routine with the other remote devices 8, 10. As a result, the start of the switching period, T, for each remote device 8, 10 begins at substantially the same time. Once coordinated, each processor 38, 48 executes the modulation routine at substantially the same switching frequency such that the duration of the switching period, T, for each remote device 8, 10 is substantially the same. Once execution has begun, the modulation routines for each remote device 8, 10 continue to operation in tandem. However, slight variations in clock frequencies or component tolerances may cause variations in the actual duration of the switching period, T, for each of the remote devices 8, 10. Periodically transmitting the synchronizing signal from the master processor 21 allows the processors 38, 48 of each remote device 8, 10 to resynchronize the start of their respective switching period, T, with the other remote devices 8, 10. Optionally, each processor 38, 48 may be configured to execute the modulation routine at switching frequencies that are multiples of each other, such as 2 kHz and 4 kHz. Because the largest components of the reactive currents typically occur at multiples of the switching frequency, processors 38, 48 having switching frequencies executing at multiples of each other generate at least a portion of their harmonic components of reactive current at like frequencies.

Figure 6:
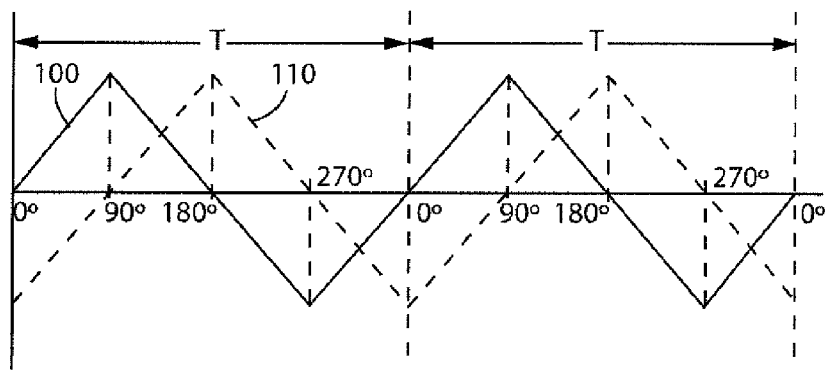
FIG. 6 is a graphical representation of a pair of carrier signals offset from each other according to one embodiment of the invention.

Referring next to FIGS. 5 and 6, each processor 38, 48 in each remote device 8, 10 generates a carrier signal 100, 110 for use by a modulation routine. The modulation routine of the first inverter section 32 generates a first carrier signal 100, and the modulation routine of the second inverter section 42 generates a second carrier signal 110. Each reference signal 100, 110 is repeated within each switching period, T. According to the illustrated embodiment, each carrier signal 100, 110 is a triangular waveform, having a maximum value and a minimum value symmetrical about zero. The period, T, is defined as having three hundred sixty degrees, similar to a sinusoidal waveform with zero degrees defining the start of a period and 360 degrees defining the end of a period. The start of the next period, T, overlaps the end of the prior period. According to FIG. 5, each of the carrier signals 100, 110 have a carrier phase angle of zero degrees. Setting the carrier phase angle to a value other zero degrees, shifts the carrier signal 100, 110 within the period, T. For example, in FIG. 6, the carrier phase angle of the first carrier signal 100 remains at zero degrees but the carrier phase angle of the second carrier signal 110 is set to ninety degrees. As a result, the periodic waveform is shifted by one quarter of the period, T.

Referring next to FIGS. 7-10, the processor 38, 48 in each remote device 8, 10 executes the modulation routine to generate switching signals 35, 45 to control the switches in the respective inverter section 32, 42 as a function of the carrier signals 100, 110. In each of the figures, execution of two periods of a modulation routine is illustrated. A control module executing on the first processor 38 generates a first voltage reference signal 102a-c for each phase of the output 14 of the first remote device 8, and a control module executing on the second processor 48 generates a second voltage reference signal 112a-c for each phase of the output 18 of the second remote device 10. Each of the voltage reference signals 102a-c, 112a-c is compared against the respective carrier signal 100, 110. When the voltage reference signal 102a-c, 112a-c for one of the phases is greater than the respective carrier signal 100, 110, the modulation routine generates switching signals 35, 45 to connect the corresponding phase of the output 14, 18 to the DC bus 24. During the periods when each phase of the output 14, 18 is connected to the DC bus 24, that phase conducts current 104, 114 to the respective motor 16, 20 connected to the remote device 8, 10. Exemplary waveforms for the currents 104a-c, 114a-c present on each phase of the output 14, 18 are illustrated below the corresponding waveform illustrating the comparison of the voltage reference signals 102a-c, 112a-c to the carrier signals 100, 110. The final waveform illustrates the DC bus current 120, $I_{DC}$, present on the DC bus 24 as a result of the high frequency switching by each of the inverter sections 32, 42 in the remote devices 8, 10.

Figure 7:
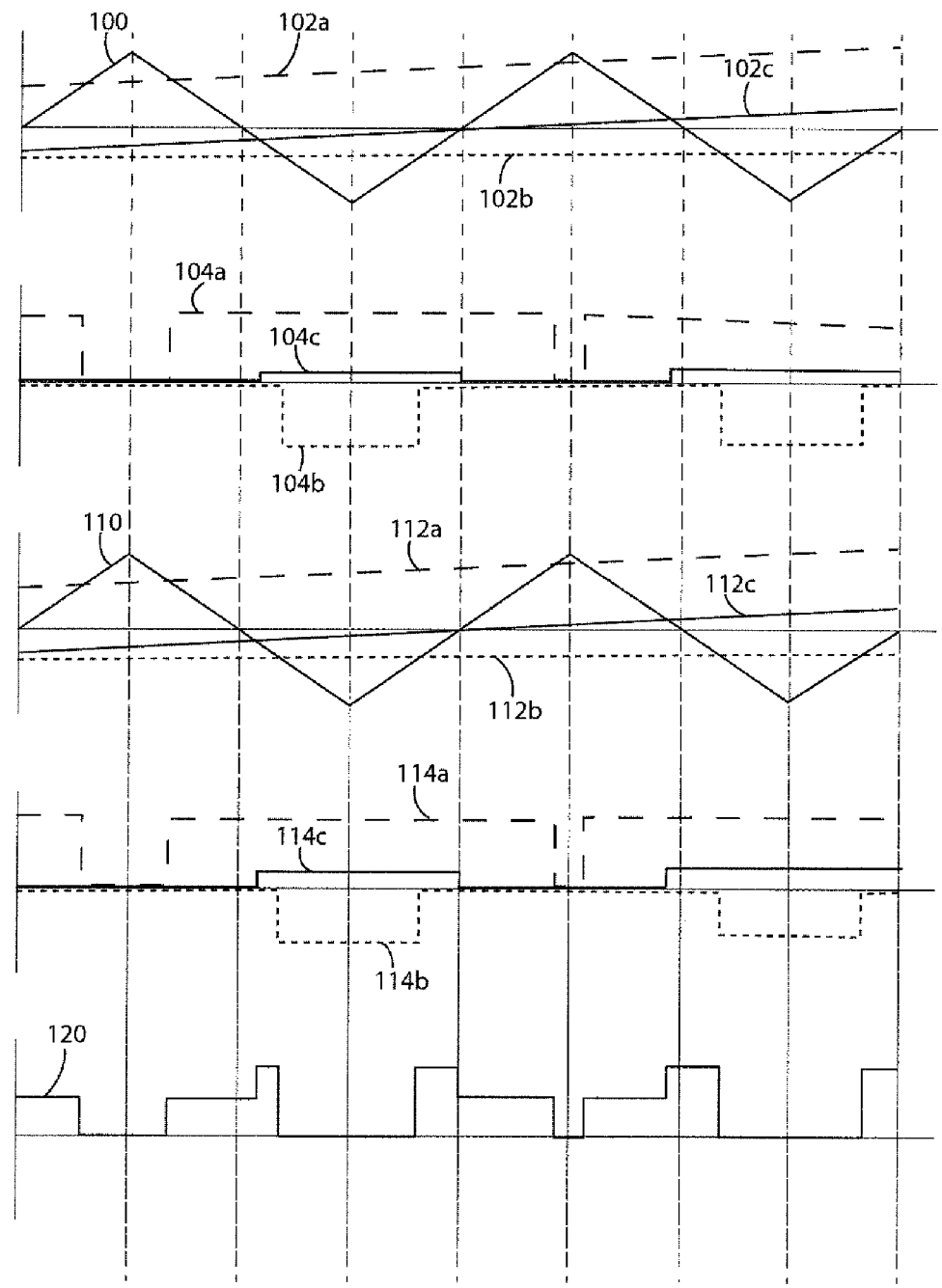
FIG. 7 is a graphical representation of the current drawn by two motors where each motor is in a motoring mode of operation and the pair of carrier signals are aligned with each other.

Each of the graphs in FIGS. 7-10 illustrates a different set of operating conditions for the two remote devices 8, 10. For each of the exemplary operating conditions illustrated, the inverter sections 32, 42 of each remote device 8, 10 use the synchronizing signal to coordinate the start of the switching period, T, of its respective modulation routine, and the switching period, T, for each inverter section 32, 42 is set to the same duration. In FIG. 7, each of the motors 16, 20 controlled by the remote devices 8, 10 are operating in a motoring mode, and the carrier phase angle for the carrier signals 100, 110 generated by each processor 38, 48 is set to zero degrees. As a result, each carrier signal 100, 110 is in phase with the other. Further, the voltage references 102a-c, 112a-c for each of the respective inverter sections 32, 42 are substantially the same resulting in output currents 104a-c, 114a-c for each remote device 8, 10 that are substantially the same. As a result, the reactive current generated by each inverter section 32, 42 is substantially in phase and has similar magnitudes. The DC bus current 120, therefore, has an increase in the total reactive current present compared to the reactive current that would be generated by either inverter section 32, 42 operating alone.

Figure 8:
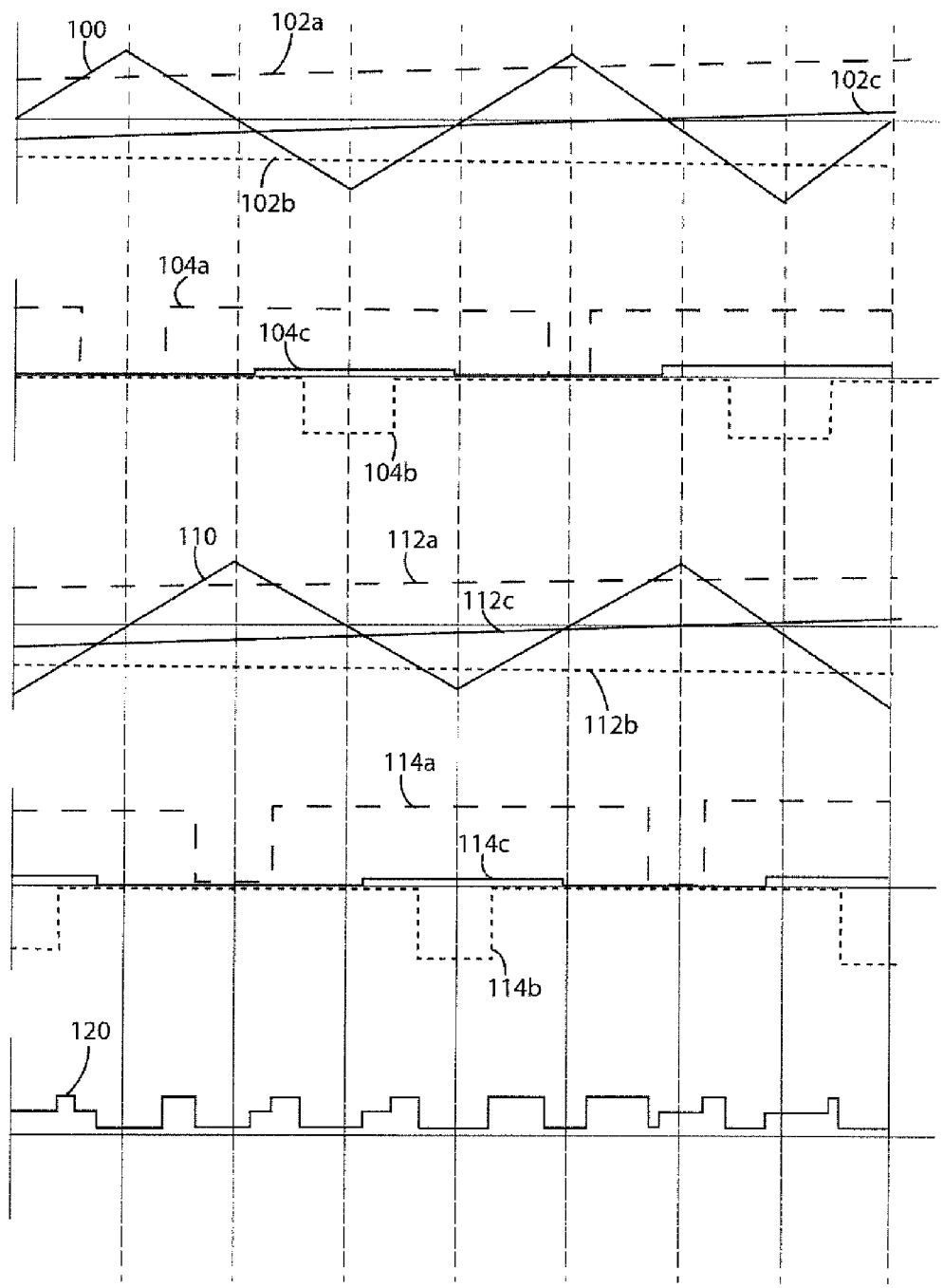
FIG. 8 is a graphical representation of the current drawn by two motors where each motor is in a motoring mode of operation and the pair of carrier signals are offset from each other.

In contrast, each of the motors 16, 20 controlled by the remote devices 8, 10 are still operating in a motoring mode in FIG. 8; however, the carrier phase angle of the first carrier signal 100 is set to zero degrees and the carrier phase angle of the second carrier signal 110 is set to ninety degrees. The currents 104a-c generated by the first inverter section 32 are the same as illustrated in FIG. 7. However, the output currents 114a-c generated by the second inverter section 42 are shifted in phase as a result of the carrier phase angle offset. As a result, the reactive currents generated by each inverter section 32, 42 are out of phase with each other, and the reactive current generated by the second inverter section 42 at least partially cancels the reactive current generated by the first inverter section 32. The DC bus current 120, therefore, has a lower total reactive current present compared to the reactive current that would be generated by either inverter section 32, 42 operating alone.

Figure 9:
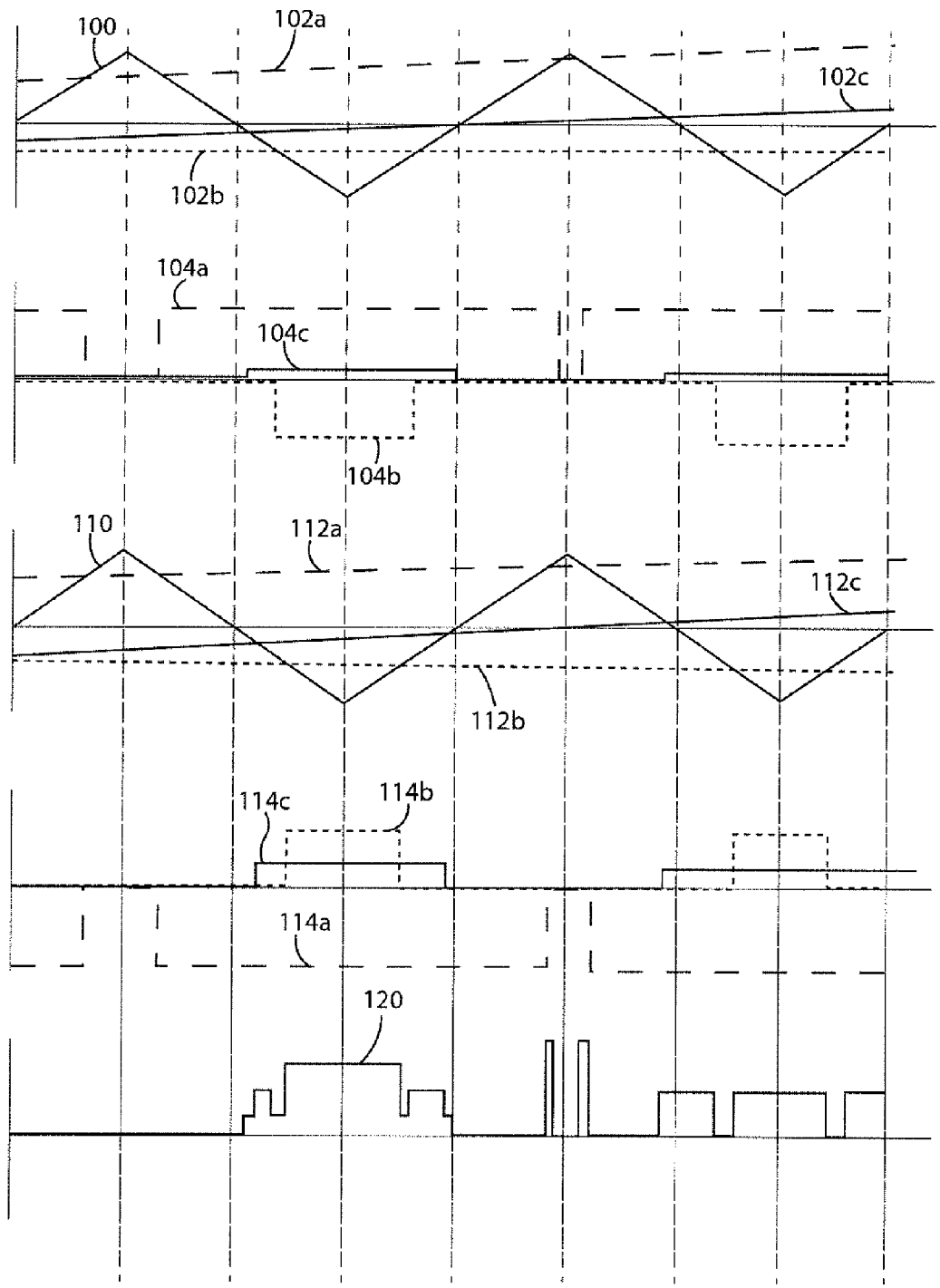
FIG. 9 is a graphical representation of the current drawn by two motors where one motoring is in a regenerative mode of operation and the other motor is in a motoring mode of operation and the pair of carrier signals are aligned with each other.
Figure 10:
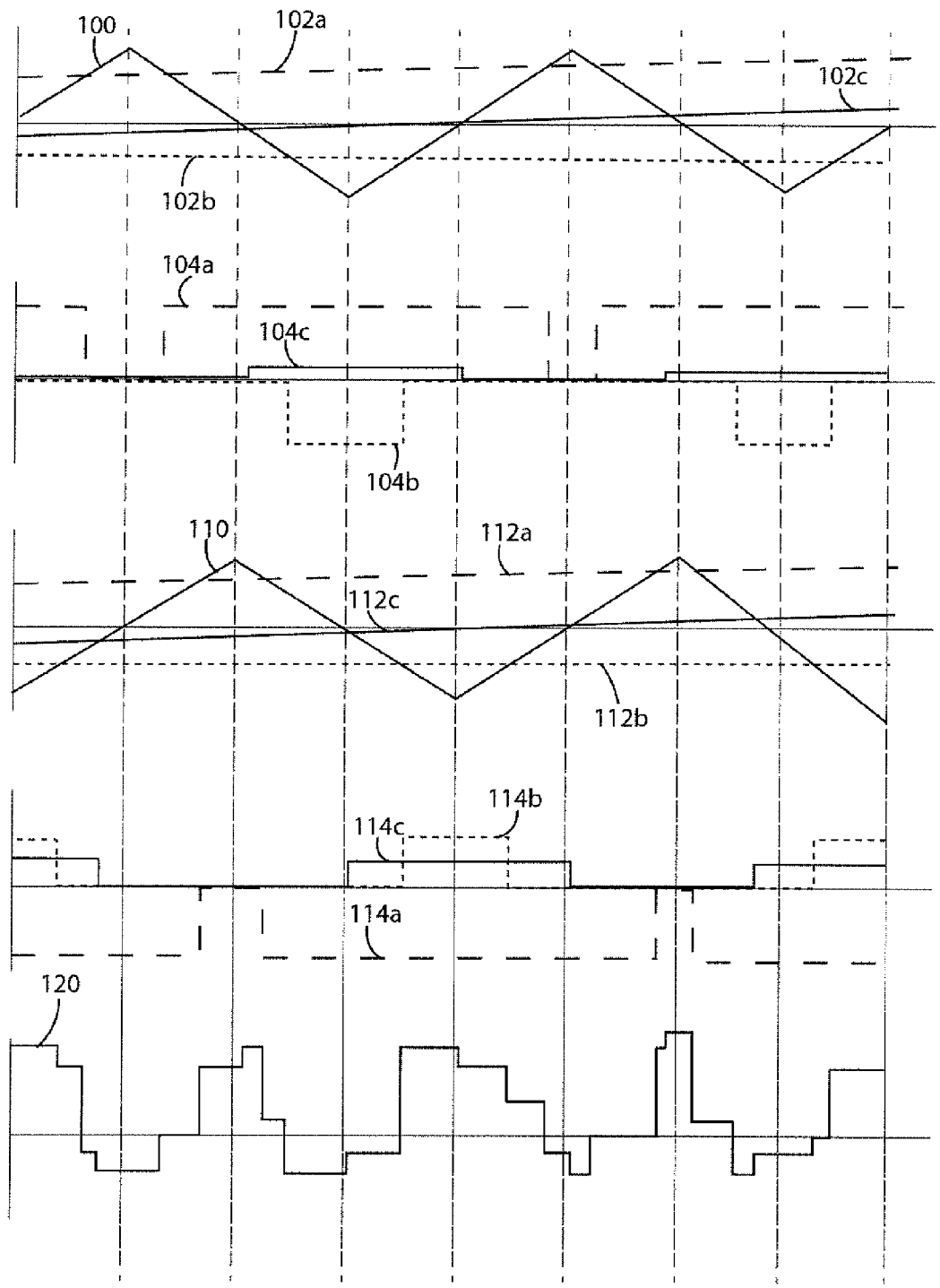
FIG. 10 is a graphical representation of the current drawn by two motors where one motoring is in a regenerative mode of operation and the other motor is in a motoring mode of operation and the pair of carrier signals are offset from each other.

In FIGS. 9 and 10, the motor 16 controlled by the first remote device 8 is operating in a motoring mode; however, the motor 20 controlled by the second remote device 10 is operating in a regenerative mode. The inventors observed that the effects on reactive current are reversed when compared to FIGS. 7 and 8 in which both motors 16, 20 are in a motoring mode. In FIG. 9, the carrier phase angle for the carrier signals 100, 110 generated by each processor 38, 48 is set to zero degrees. However, the reactive current generated by the second inverter section 42 is out of phase with the reactive current generated by the first inverter section 32 and, therefore, the reactive current generated by the second inverter section 42 at least partially cancels the reactive current generated by the first inverter section 32. The DC bus current 120, therefore, has a lower total reactive current present compared to the reactive current that would be generated by either inverter section 32, 42 operating alone.

In FIG. 10, the carrier phase angle of the first carrier signal 100 is set to zero degrees and the carrier phase angle of the second carrier signal 110 is set to ninety degrees. Although the output currents 114a-c generated by the second inverter section 42 are still shifted as a result of the carrier phase angle offset, the reactive current generated by each inverter section 32, 42 is substantially in phase. The DC bus current 120, therefore, has an increase in the total reactive current present compared to the reactive current that would be generated by either inverter section 32, 42 operating alone. Consequently, selection of a carrier phase angle for each of the carrier signals 100, 110 in a remote device 8, 10 is a function of whether the corresponding motor 16, 20 controlled by the remote device 8, 10 is operating in a motoring mode or in a regenerating mode. In addition, each motor 16, 20 may transition between the motoring mode and the regenerating mode while continuing to rotate due, for example, to a change in the load on the motor 16, 20 or to a change in the commanded speed of the motor 16, 20. The carrier phase angle for the carrier signals 100, 110 generated by each processor 38, 48, therefore, may also be modified during operation such that the reactive currents generated by each remote device 8, 10 continue to cancel each other regardless of the operating mode of the motors 16, 20.

Figure 11:
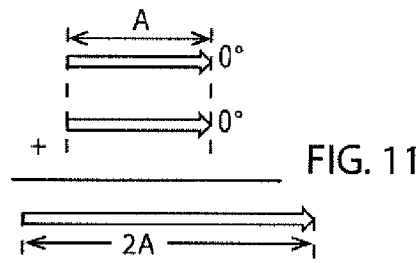
FIG. 11 is a vector representation of the reactive current generated by two inverters where the phase angle of the reactive current is in phase with each other.
Figure 13:
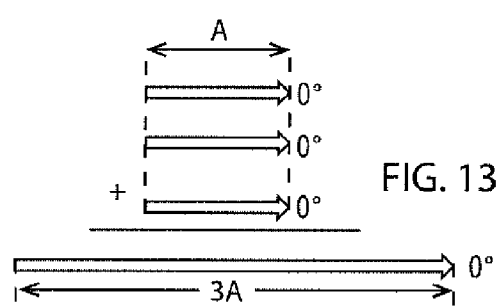
FIG. 13 is a vector representation of the reactive current generated by three inverters where the phase angle of the reactive current is in phase with each other.

The carrier phase angle selected for each of the carrier signals 100, 110 is also a function of the number of inverter sections connected to the common DC bus. Referring again to FIG. 1, any number of inverters 15 may be connected to the DC bus 13. The total current, $I_{DC}$, present on the shared DC bus 13 is equal to the sum of the currents (e.g., $I_1+I_2+ \ldots +I_n$) required by each of the inverters 15. Similarly, the reactive current generated by each of the inverters 15 is also present on the DC bus 13 and the total reactive current present on the shared DC bus 13 is the sum of the reactive currents generated by each of the inverters 15. The effect of the reactive current from varying numbers of inverters 15 is illustrated, for example in FIGS. 11 and 13. It is known that an alternating current may be represented as a phasor quantity having an amplitude and an angle. In FIG. 11, two inverters 15 are connected to the DC bus and the reactive current generated by each of the inverters 15 is represented as a current having a magnitude equal to "A" and an angle of zero degrees. The resulting reactive current at the output of the converter 11 has a magnitude equal to "2A" or twice the magnitude of each of the inverters 15 at an angle of zero degrees. In FIG. 13, three inverters 15 are connected to the DC bus and the reactive current generated by each of the inverters 15 is represented as a current having a magnitude equal to "A" and an angle of zero degrees. The resulting reactive current at the output of the converter 11 has a magnitude equal to "3A" or three times the magnitude of each of the inverters 15 at an angle of zero degrees.

Figure 12:
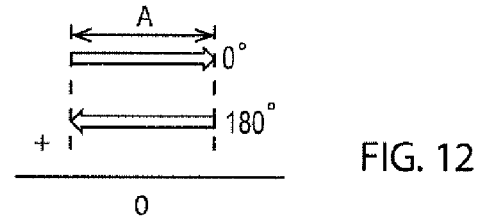
FIG. 12 is a vector representation of the reactive current generated by two inverters where the phase angle of the reactive current is out of phase with each other.
Figure 14:
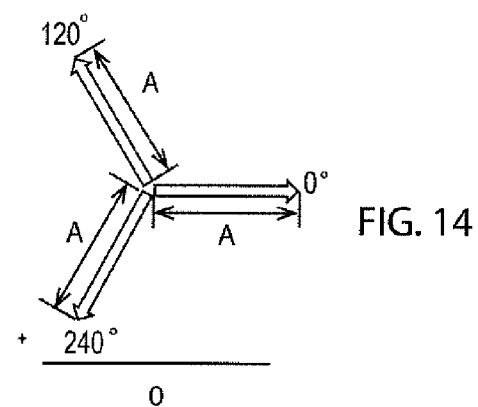
FIG. 14 is a vector representation of the reactive current generated by three inverters where the phase angle of the reactive current is out of phase with each other.

By controlling the carrier phase angle of each of the carrier signals in the inverters 15, the phase angle of the reactive current generated from each of the inverters 15 is controlled such that the total reactive current on the shared DC bus 13 is reduced. Referring next to FIGS. 12 and 14, the effect of controlling the phase angle of the reactive current on the total reactive current is illustrated. In FIG. 12, two inverters 15 are connected to the DC bus. The carrier phase angle of the first inverter 15 is set to zero degrees, and the reactive current generated by a first inverter 15 has a magnitude equal to "A" and an angle of zero degrees. The carrier phase angle of the second inverter 15 is set to ninety degrees, and the reactive current generated by the second inverter 15 has a magnitude equal to "A" and an angle of one hundred eighty degrees. Consequently, the reactive current generated by the second inverter cancels the reactive current generated by the first inverter and the resulting reactive current on the shared DC bus 13 is zero. In FIG. 14, three inverters 15 are connected to the DC bus. The carrier phase angle of the first inverter is set to zero degrees, and the reactive current generated by the first inverter 15 has a magnitude equal to "A" and an angle of zero degrees. The carrier phase angle of the second inverter is set to sixty degrees, and the reactive current generated by the first inverter 15 has a magnitude equal to "A" and an angle of one hundred twenty degrees. The carrier phase angle of the third inverter is set to one hundred twenty degrees, and the reactive current generated by the third inverter 15 has a magnitude equal to "A" and an angle of two hundred forty degrees. Consequently, the reactive currents generated by the three inverters cancel each other and the resulting reactive current on the shared DC bus 13 is zero. FIGS. 12 and 14 represent idealized cancellation of reactive current and actual magnitudes and phases of the reactive currents generated by the inverters may vary. By controlling the carrier phase angle and, in turn, controlling the phase angle of the reactive current, at least a portion of the reactive current from the first inverter 15 is cancelled by the reactive current from the second inverter 15. Thus, the magnitude of the resulting reactive current on the shared DC bus 13 is less than magnitude of the reactive current that would be present if any one of the inverters 15 is operating by itself.

According to one embodiment of the invention, a preset value of the carrier phase angle may be assigned to each inverter 15 connected to the DC bus 13. Referring again to FIG. 3, the memory device 40, 50 in each of the remote devices 8, 10 may store the assigned carrier phase angle and the respective processor 38, 48 may retrieve the stored value for generation of the carrier signal. The value of the carrier phase angle may be selected as a function of the switching frequency or multiples thereof, the output frequency or multiples thereof, the number of remote devices 8, 10 connected to the common DC bus 24, the operating mode of a motor 16, 20 controlled by one of the remote devices 8, 10, or a combination thereof.

According to another embodiment of the invention, the value of the carrier phase angle may be dynamically determined for each of the remote devices 8, 10. The memory device 40, 50 in each of the remote devices 8, 10 may have, for example, a look-up table in which multiple carrier phase angle values are stored. The carrier phase angle for each of the remote devices 8, 10 may be a first value if two inverter sections 32, 42 are connected to the DC bus 24 and a different value for each additional inverter section that is connected to the DC bus 24. Similarly, three or more inverter sections may be connected but not all enabled at the same time to control their respective AC motor. The communication media 17 between processors may transmit data indicating the number of inverter sections that are currently enabled. Thus, the carrier phase angle for each device may be dynamically updated as different inverter sections are enabled and disabled. Further, the switching frequency of different inverter sections 32, 42 may be set to different values. The communication media 17 may also transmit data indicating the switching frequency of each inverter section. The inverter sections 32, 42 may then determine a carrier phase angle for each inverter section as a function of the number of inverter sections 32, 42 having either the same switching frequency or switching frequencies at multiples of each other. According to one embodiment of the invention, the processor 38, 48 in each remote device 8, 10 determines the carrier phase angle for the respective device. According to another embodiment of the invention, each of the processors 38, 48 transmit the operating status of the device to a master processor, which may be, for example, the processor 21 in the converter 27, and the master processor determines the carrier phase angle for each device and transmits the carrier phase angle to the respective devices.

According to yet another embodiment of the invention, the processor 38, 48 may measure the current present on the DC bus 24 and determine the carrier phase angle of each of the devices. The processor 38, 48 receives a feedback signal corresponding to the current present on the DC bus 24. The processor 38, 48 determines the spectral content of the feedback signal which contains amplitude information for varying frequencies present on the DC bus 24. The spectral content may be determined, for example, using a fourier transform, which may be a function of the output frequency and/or the switching frequency. A high frequency component of the current may be identified from the spectral content, for example, according to the component having the greatest amplitude. The phase of the identified frequency component may then be determined. Multiple processors 38, 48 communicate between each other the respective amplitude and/or phase of the identified frequency component to be compensated.

Figure 15:
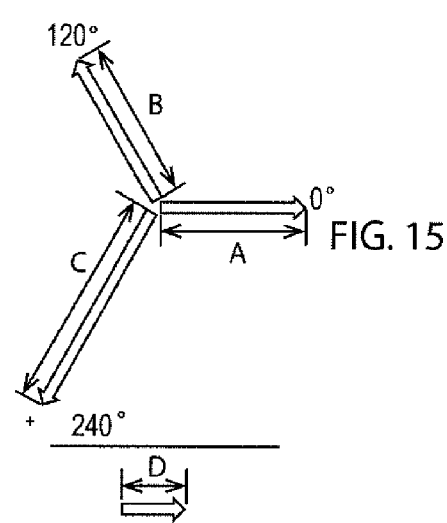
FIG. 15 is a vector representation of the reactive current generated by three inverters where the magnitude of each reactive current varies and the phase angle of the reactive current are out of phase with each other.
Figure 16:
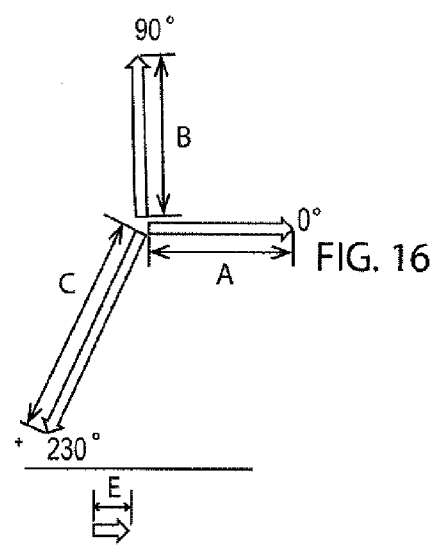
FIG. 16 is a vector representation of the reactive current generated by three inverters where the magnitude of each reactive current varies and the phase angle of the reactive current are out of phase with each other.

It is further contemplated that the magnitude of the reactive current may be estimated as a function of the operating parameters conditions of each inverter section 32, 42. As discussed above, the processor 38, 42 receives a reference signal identifying desired operation of the motor 16 which is used to control operation of the motor drive 9. The reference signal may be, for example, a desired torque, speed, or angular position of the motor. The program generates, for example, an internal torque or current reference which is provided to a current regulator. The current regulator generates the desired voltage reference signal 102, 112 provided to the PWM module. Based on these desired operating conditions, the generated reference signals, the motor parameters, or a combination thereof, each processor 38, 42 may be configured to determine an expected magnitude of reactive current. The carrier phase angle for each inverter section 32, 42 may then be determined to provide the best reduction of total reactive current on the DC bus 24 as a function of the measured current, estimated current, or a combination thereof. With reference to FIGS. 1, 15, and 16, three inverters 15 are connected to the DC bus 13. Each of the inverters 15 determine that they are generating a reactive current at substantially the same frequency with magnitudes of "A", "B", and "C". If the carrier phase angles of the inverters are set such that the phase angle of the respective reactive currents are zero degrees, one hundred twenty degrees, or two hundred forty degrees, as discussed above with respect to FIG. 14, the resulting reactive current may have, for example, a magnitude equal to "D" at zero degrees as shown in FIG. 15. Although the magnitude of "D" is less than the largest magnitude of the reactive current generated by any one of the inverters 15, it may not be the best obtainable reduction in reactive current. For instance, with reference to FIG. 16, the carrier phase angle of the inverters 15 may be set such that the phase angle of each reactive current is zero degrees, ninety degrees, and two hundred thirty degrees. The resulting reactive current on the DC bus has a magnitude of "E" at zero degrees, where the magnitude of "E" is less than the magnitude of "D". Thus, the carrier phase angle may also be determined as a function of the magnitude of the reactive current generated by the inverters 15.

It is further contemplated that one of the processors may be configured to generate carrier phase angles for each inverter 15. A control routine receives a reference corresponding, for example, to a desired magnitude of reactive current or a desired percentage reduction in the reactive current. The reactive current either measured or estimated at each inverter 15 is transmitted to the processor generating carrier phase angles. The control routine then generates carrier phase angles at which each inverter is to operate as a function or the reactive current and the reference signal.

According to yet another embodiment of the invention, the carrier phase angle may be utilized to reduce conducted emissions generated by the inverters 15. The high frequency content of the reactive current may result in radiated and/or conducted emissions that are coupled back to the AC input voltage. For example, leakage currents may be established through capacitive coupling between leads and the ground connections. If left unmitigated, these conducted emissions could interfere with other electrical devices receiving the same input voltage or connected elsewhere within the facility. If the carrier phase angles of two inverters 15 operating under substantially identical operating conditions are set one hundred eighty degrees apart from each other, the emissions generated by the first inverter will offset the emissions generated by the second inverter. If more than two inverters 15 exist in the system, the carrier phase angle of a portion of the inverters 15 may be set to zero degrees and the carrier phase angle of the remaining inverters 15 may be set to one hundred eighty degrees.

Figure 17:
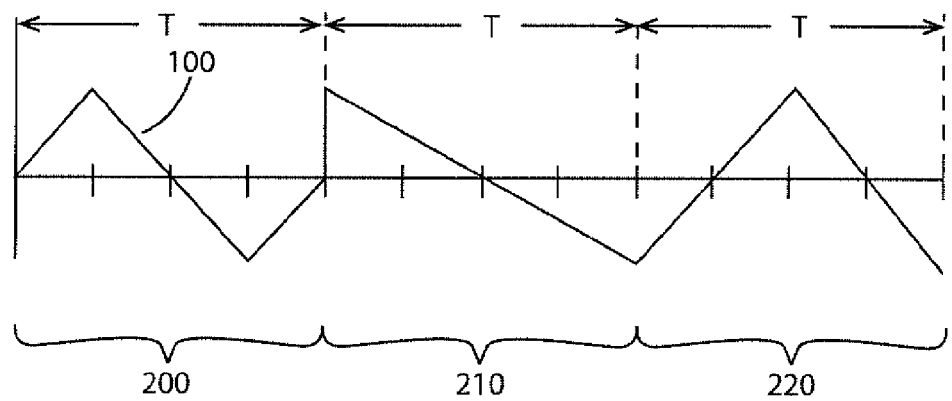
FIG. 17 is a graphical representation of a carrier signal transitioning between operating modes according to one embodiment of the present invention.

However, as previously discussed reactive currents are best reduced by carrier phase angles other than zero and one hundred eighty degrees. In fact, the reactive current may be amplified by setting the carrier phase angle of a first inverter 15 to zero degrees and a second inverter 15 to one hundred eighty degrees. Thus, the processor configured to generate carrier phase angles for each inverter 15, may further monitor the magnitude of current supplied by each inverter 15 to its corresponding motor to determine a desired operating mode. If for example, the current output to the motor is below a threshold, such as fifty percent of rated current for the inverter 15, the carrier phase angle may be controlled to minimize the conducted emissions generated by the inverter 15. If, however, the current output to the motor is above the threshold, the carrier phase angle may be controlled to minimize the reactive current on the DC bus 13. When the carrier phase angle of an inverter 15 is updated dynamically, it may result in an undesirable step change in the output of the inverter 15. Referring next to FIG. 17, the processor may generate a transitional carrier signal during a transition between carrier phase angles. During the first period 200, the inverter 15 is in a first operating mode and has determined a first carrier phase angle at which the carrier signal is to be generated. The operating conditions of the system change, for example, due to the motor controlled by an inverter 15 switching between motoring and regenerative operation or by the addition or subtraction of an enabled inverter 15 connected to the DC bus 13. A new carrier phase angle is determined for operation in a second operating mode. At the end of the first period 200, the carrier signal is changed from a triangle waveform to a ramp waveform. The carrier signal preferably remains a ramp waveform for one period 210 and then reverts to a triangle waveform having the new carrier phase angle during the third period 220. This transition between operating modes reduces undesirable step changes in the output of the inverter 15.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for reducing a reactive current present on a direct current (DC) bus, the DC bus having a first voltage rail and a second voltage rail wherein the DC bus is configured to have a DC voltage potential present between the first voltage rail and the second voltage rail, the system comprising:
    a plurality of inverters, each inverter including:
        an input configured to connect to the first and second voltage rails of the DC bus,
        an output configured to connect to an alternating current (AC) load,
        a plurality of switching devices, each switching device controlled by a switching signal to alternately connect and disconnect the input to the output, and
        a modulation module configured to execute at a periodic interval, wherein during each periodic interval the modulation module determines each of the switching signals as a function of a carrier signal that repeats each periodic interval and at least one voltage reference signal, wherein each carrier signal is defined, at least in part by a carrier phase angle and each voltage reference signal corresponds to a desired output voltage for each phase of the AC load;
    a synchronizing signal in communication with each of the modulation modules, wherein the synchronizing signal is used by each modulation module to start its corresponding periodic interval at substantially the same time;
    a controller generating the carrier phase angle for each inverter, wherein the carrier phase angle is different for each inverter; and a communication medium operatively connected between the controller and each inverter to transmit the carrier phase angle between the controller and each inverter such that a first reactive current generated by the plurality of switching devices alternately connecting and disconnecting the input to the output in a first inverter is at least partially cancelled by a second reactive current generated by the plurality of switching devices alternately connecting and disconnecting the input to the output in a second inverter.

2. The system of claim 1 wherein the controller includes a processor configured to generate each of the carrier phase angles.

3. The system of claim 2 wherein the processor is further configured to generate each of the carrier phase angles to minimize the reactive current present on the DC bus.

4. The system of claim 2 wherein the processor is further configured to generate each of the carrier phase angles to minimize the conducted emissions generated by each of the plurality of inverters.

5. The system of claim 1 wherein each inverter further includes a processor and the controller is defined, at least in part, by the processors of each inverter and wherein each of the processors is configured to generate the carrier phase angle for its corresponding inverter.

6. The system of claim 1 wherein the carrier phase angle is determined as a function of a total number of the plurality of inverters connected to the DC bus.

7. The system of claim 1 wherein the AC load connected to each inverter is an AC motor and wherein the controller generates a first carrier phase angle and a second carrier phase angle for at least one of the inverters, wherein the first carrier phase angle is different than the second carrier phase angle and wherein the first carrier phase angle is generated when the AC motor is operating in a motoring mode and the second carrier phase angle is generated when the AC motor is operating in a regenerative mode.

8. The system of claim 1 wherein:
each of the inverters further includes an enable input,
the modulation module is configured to execute when the enable input is active,
the modulation module is configured to stop execution when the enable input is inactive, and
the carrier phase angle is determined as a function of a total number of the plurality of inverters in which the enable input is active.

9. The system of claim 1 wherein the controller is configured to generate a first carrier phase angle for each inverter in a first operating mode and a second carrier phase angle for each inverter in a second operating mode, and wherein the carrier signal is a first waveform during each of the first and the second operating modes and the carrier signal is a second waveform during at least one periodic interval to transition between the first operating mode and the second operating mode.

10. The system of claim 1 wherein each inverter includes a current sensor configured to generate a signal corresponding to the current present at the input and wherein the controller generates the carrier phase angle for each inverter as a function of the signal from the current sensor.

11. An inverter for connection to a common direct current (DC) bus, wherein the common DC bus has a first voltage rail, a second voltage rail, a DC voltage potential present between the first voltage rail and the second voltage rail, and at least one additional inverter connected to the common DC bus, the inverter comprising:
a first input configured to receive a synchronizing signal;
a second input configured to receive an indication of the number of additional inverters connected to the common DC bus;
a DC bus input configured to connect to the first and second voltage rails of the common DC bus;
an output configured to connect to an alternating current (AC) load;
a memory device configured to store an identifier corresponding to each inverter;
a controller configured to generate a carrier phase angle, wherein the carrier phase angle is determined as a function of the number of additional inverters connected to the common DC bus and of the identifier;
a plurality of switching devices, each switching device controlled by a switching signal to alternately connect and disconnect the DC bus input to the output; and
a modulation module configured to execute at a periodic interval, wherein a start time of each periodic interval is defined, at least in part, by the synchronizing signal and wherein during each periodic interval the modulation module determines each of the switching signals as a function of a carrier signal that repeats within the periodic interval and at least one voltage reference signal, wherein each carrier signal is defined at least in part by the carrier phase angle and each voltage reference signal corresponds to a desired output voltage for each phase of the AC load.

12. The inverter of claim 11 wherein the first input and the second input are combined in a network interface configured to receive packets containing data, wherein the data includes the synchronizing signal and the number of additional inverters connected to the common DC bus.

13. The inverter of claim 11 wherein the controller is configured to generate a first carrier phase angle in a first operating mode and a second carrier phase angle in a second operating mode, and wherein the carrier signal is a first waveform during each of the first and the second operating modes and the carrier signal is a second waveform during at least one periodic interval to transition between the first operating mode and the second operating mode.

14. The inverter of claim 13 wherein the AC load is an AC motor and wherein the inverter is in the first operating mode when the AC motor is in a motoring mode and the inverter is in the second operating mode when the AC motor is in a regenerative mode.

15. The inverter of claim 13 wherein the controller is configured to initially execute in the first operating mode, and when the number of additional inverters connected to the common DC bus changes while the controller is executing in the first operating mode, the controller transitions to execute in the second operating mode.

16. A method of controlling a plurality of inverters, wherein each inverter converts a direct current (DC) voltage from a shared DC bus to an alternating current (AC) voltage, the method comprising the steps of:
generating a synchronizing signal with a controller, wherein the synchronizing signal defines a start of a periodic interval for a modulation module for each of the inverters;
determining a carrier phase angle for each of the inverters with the controller, wherein the carrier phase angle for each inverter is different and is determined such that a first reactive current generated by a first inverter is at least partially cancelled by a second reactive current generated by a second inverter;
transmitting the carrier phase angle from the controller to each inverter via a communication medium;

generating a carrier signal for the modulation module for each of the inverters with the controller as a function of the carrier phase angle; and executing the modulation module for each inverter to determine a plurality of switching signals as a function of the carrier signal and of at least one voltage reference signal, wherein each voltage reference signal corresponds to a desired output voltage for each phase of the AC voltage and each switching signal controls a switching device to alternately connect and disconnect the DC bus to an output of the inverter.

17. The method of claim 16 further comprising the steps of:

measuring a current present on the DC bus;

determining a harmonic content of the current present on the DC bus; and determining the carrier phase angle as a function of the harmonic content.

18. The method of claim 16 further comprising the step of monitoring an operating status of each of the inverters to determine how many of the inverters are enabled, wherein the carrier phase angle is determined as a function of the number of inverters that are enabled.

19. The method of claim 16 wherein each of the inverters is connected to an AC motor further comprising the step of monitoring current flow between each inverter and the corresponding AC motor to determine whether the AC motor is operating in a motoring mode or a regenerative mode, wherein the carrier phase angle for each inverter is determined as a function of whether the AC motor connected to the inverter is operating in the motoring mode or the regenerative mode.

20. The method of claim 16 wherein the controller is configured to execute in a first operating mode and in a second operating mode, wherein when the controller is executing in the first operating mode, the controller is configured to generate each of the carrier phase angles to minimize the reactive current present on the DC bus and when the controller is executing in the second operating mode, the controller is configured to generate each of the carrier phase angles to minimize the conducted emissions generated by the inverters.

* * * * *